Feb. 28, 1939.     H. W. SHELLY     2,149,125
AUTO DIRECTION SIGNAL
Filed March 14, 1938
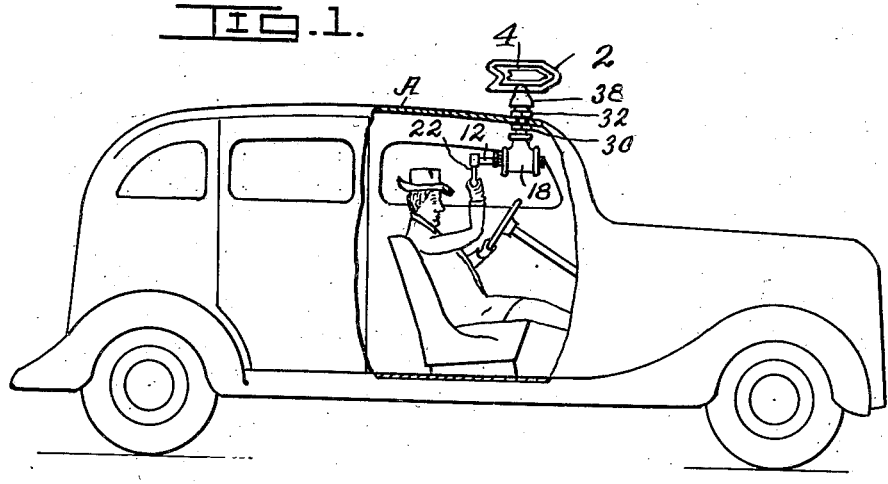
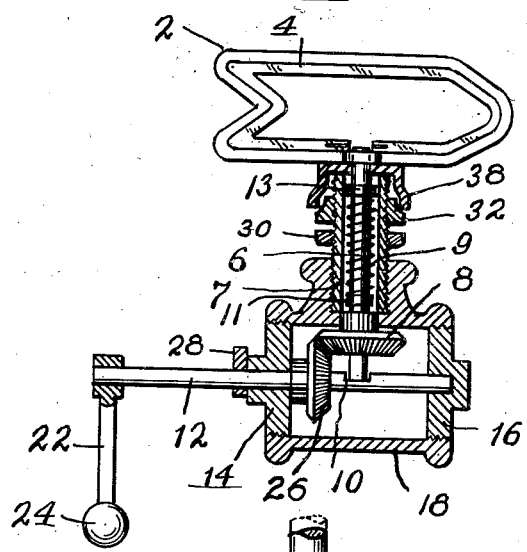
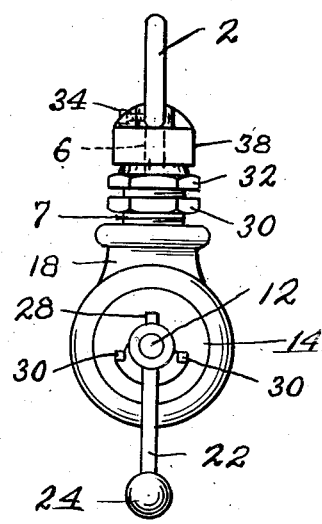
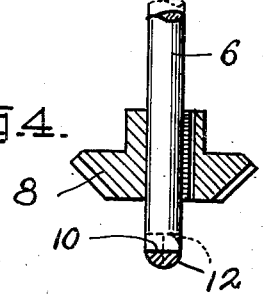
Inventor:
Harry W. Shelly,
By F. G. Fischer,
Attorney.

UNITED STATES PATENT OFFICE 2,149,125

AUTO DIRECTION SIGNAL

Harry W. Shelly, St. Joseph, Mo.

Application March 14, 1938, Serial No. 195,833

3 Claims. (Cl. 116—48)

My invention relates to an auto direction signal whereby the driver of an automobile may indicate in advance when he is about to turn to the right or left.

Preferably the signal indicating element of the device is in the form of an arrow located above the top of the car where it may be plainly seen by drivers approaching either from the front or rear. However, it is to be understood that if desired the signal indicating element may be placed at other points such, for instance, as at one side of the car, or upon the radiator. The signal indicating element is provided with illuminating means so that it may be seen at night.

Objects of the invention are to provide a simple and inexpensive signal device which is semi-automatic in operation, that is to say, after the signal indicating element has been manually turned either to the right or left by the driver it will automatically return to a straight-ahead position.

In order that the invention may be fully understood, reference will now be had to the accompanying drawing, in which:

Fig. 1 shows a broken side elevation of an automobile equipped with my signaling device.

Fig. 2 is a vertical sectional view of the signaling device.

Fig. 3 is a front elevation of the signaling device.

Fig. 4 is a broken detail showing one of the shafts splined to a gear wheel of the device so that they will turn together and at the same time permit the shaft to move vertically.

Fig. 5 shows part of the electric circuit for supplying the light with current.

Referring in detail to the different parts, 2 indicates a signal element of skeleton form, so that it will not offer much surface for the wind to impinge against and thus render it difficult to operate. The signal element 2 is preferably shaped like an arrow and provided with a luminescent tube 4 preferably of the Neon type shaped like the signal element 2. Circuit wires 1 and 3 are connected to the electrodes of the tube 4 and a suitable part of the electric system, not shown, of the car for supplying the tube 4 with an energizing current. The circuit wire 3 is provided with a switch 5 so that current may be turned off during the day when not needed.

The arrow 2 is fixed upon the upper end of a shaft 6 extending downwardly through a tubular element 7 and splined at its lower portion to a bevel gear 8, so that the shaft may be turned by said bevel gear and at the same time be free to move longitudinally for a purpose that will hereinafter appear.

The lower end of the shaft 6 is normally pressed against the flat surface of the notched portion 10 of an actuating shaft 12 by means of a coil spring 9 interposed between a collar 11, fixed to the shaft 6, and a collar 13 fixed within the tubular element 7. The shaft 12 is journaled in bearings 14 and 16 threaded into the front and rear ends of a T-member 18 in which the lower end of the tubular member 7 is threaded.

The outer end of the shaft 12 is provided with a fixed depending crank 22 having a weighted handle 24 at its lower end. The inner end of the shaft 12 has a fixed bevel gear 26 which intermeshes with the bevel gear 8 and like the latter is housed in the T-member 18. Rotation of the crank 22 is restricted to one-fourth of a revolution to the right or left of its dependent position shown by Fig. 3, by means of a stop 28, fixed to the shaft 12, and a pair of oppositely located lugs 30 on the bearing 14.

When assembling the device the parts are so arranged that the arrow 2 will point in the same direction in which the handle 24 is swung from its pendent position. For instance, when the handle 24 is swung upward to the right the arrow will be directed towards the right and when the handle is swung upward to the left the arrow will be directed towards the left by the intervening mechanism.

Preferably the signaling device is placed at the forward portion of the car where it can be easily reached with the right hand of the driver, and with the arrow 2 elevated above the top A of the car sufficiently to be seen by drivers approaching from the front and rear.

To install the device an aperture is formed in the top A large enough for the passage of the upper end of the tubular element 7 which is externally threaded and equipped with clamp nuts 30 and 32, the former of which is adapted to abut the under surface of the top A and thus determine the extent to which the tubular element 7 is to project above said top. The tubular element is then secured in place by placing the nut 32 thereon and screwing it down against the top A until the latter is firmly clamped between the two nuts. The arrow 2 is then secured in place upon the upper end of the shaft 6 with suitable means such as a set screw 34, threaded in a cap 38 fixed to the arrow 2 and extending downward over the upper end of the tubular member 7 to exclude rain therefrom.

In operation, when the crank 22 is swung upward to the right or left it will turn the arrow 2 in the corresponding direction through the intermediary of the intervening mechanism. As the crank 22 is actuated it rotates the shaft 12 which in turn raises the shaft 6 to the dotted line position shown by Fig. 4. When the handle 24 is released the weight thereof will automatically swing the crank 22 downward to normal position, and the shaft 6 will be forced downward by the spring 9 into the notch 10 of the shaft 12 and thus coact with the handle 24 in securing the shaft 12 against accidental turning, so that the arrow 2 will be reliably held from turning to the right or left until manually operated by the driver.

From the foregoing description it is apparent that I have provided a signaling device which is well adapted for the purpose intended, and while I have shown a preferred form of my invention I reserve all rights to such other forms and modifications thereof as properly fall within the spirit and scope of the invention as claimed.

Having thus described my invention, what I claim and desire to secure by Letters Patent, is:

1. A direction signal comprising a signal element, a shaft upon which said signal element is fixed, an actuating shaft having a notched portion with a flat surface against which the inner end of the signal carrying shaft abuts, spring means for pressing the signal carrying shaft against the flat surface of the notch to prevent accidental turning of the actuating shaft so that the latter, through the intermediary of the intermeshing gearing, may secure the signal carrying shaft from accidental turning, a gear wheel to which the signal carrying shaft is splined so that the latter may move vertically in the former, a gear wheel fixed upon the actuating shaft and intermeshing with the first-mentioned gear wheel, a housing in which the shafts are operably mounted, and a manually operable crank fixed to the actuating shaft.

2. A direction signal comprising a signal element, a shaft upon which said signal element is fixed, a gear wheel splined upon the lower portion of said shaft, an actuating shaft having a notched portion with a flat surface against which the inner end of the signal carrying shaft abuts, a gear wheel fixed upon said actuating shaft and intermeshing with the first-mentioned gear wheel, spring means for pressing the signal carrying shaft against the flat surface of the notch to prevent accidental turning of the actuating shaft so that the latter, through the intermediary of the intermeshing gearing, may secure the signal carrying shaft from accidental turning, a housing in which the gears and shafts are arranged, a depending crank fixed to the actuating shaft, and a weighted handle on said crank whereby it may be operated and coact with the signal carrying shaft in preventing accidental turning of the actuating shaft.

3. A direction signal comprising a signal element, a shaft upon which said signal element is fixed, a gear wheel mounted upon the lower portion of said shaft, a tubular element adapted to extend upward through an aperture in the roof of a car and in which the shaft is journaled, means for securing the tubular element to the roof of the car, a cap overlapping the upper end of said tubular element and secured to the signal element and the upper end of the shaft, a T-member to which the tubular element is secured, an actuating shaft mounted in said T-member, a gear wheel mounted upon the actuating shaft and intermeshing with the first-mentioned gear wheel whereby the actuating shaft may set the signal element straight-ahead or turn it to the right or left, a manually operable crank fixed to the actuating shaft and from which it normally depends to hold the signal element in straight-ahead position, and a weighted handle on said crank to automatically restore the latter to the pendant position after being swung upwardly to the right or left.

HARRY W. SHELLY.